Sept. 8, 1964  W. VAN ALAN CLARK, JR., ETAL  3,148,264
PRESET, INTERCHANGEABLE WELDING HEADS
Filed Aug. 11, 1961  6 Sheets-Sheet 1

INVENTORS
W. VAN ALAN CLARK, JR.
PHILIP TABER
RICHARD M. STEIGERWALD
BY
Moses, Nolte & Nolte
ATTORNEYS

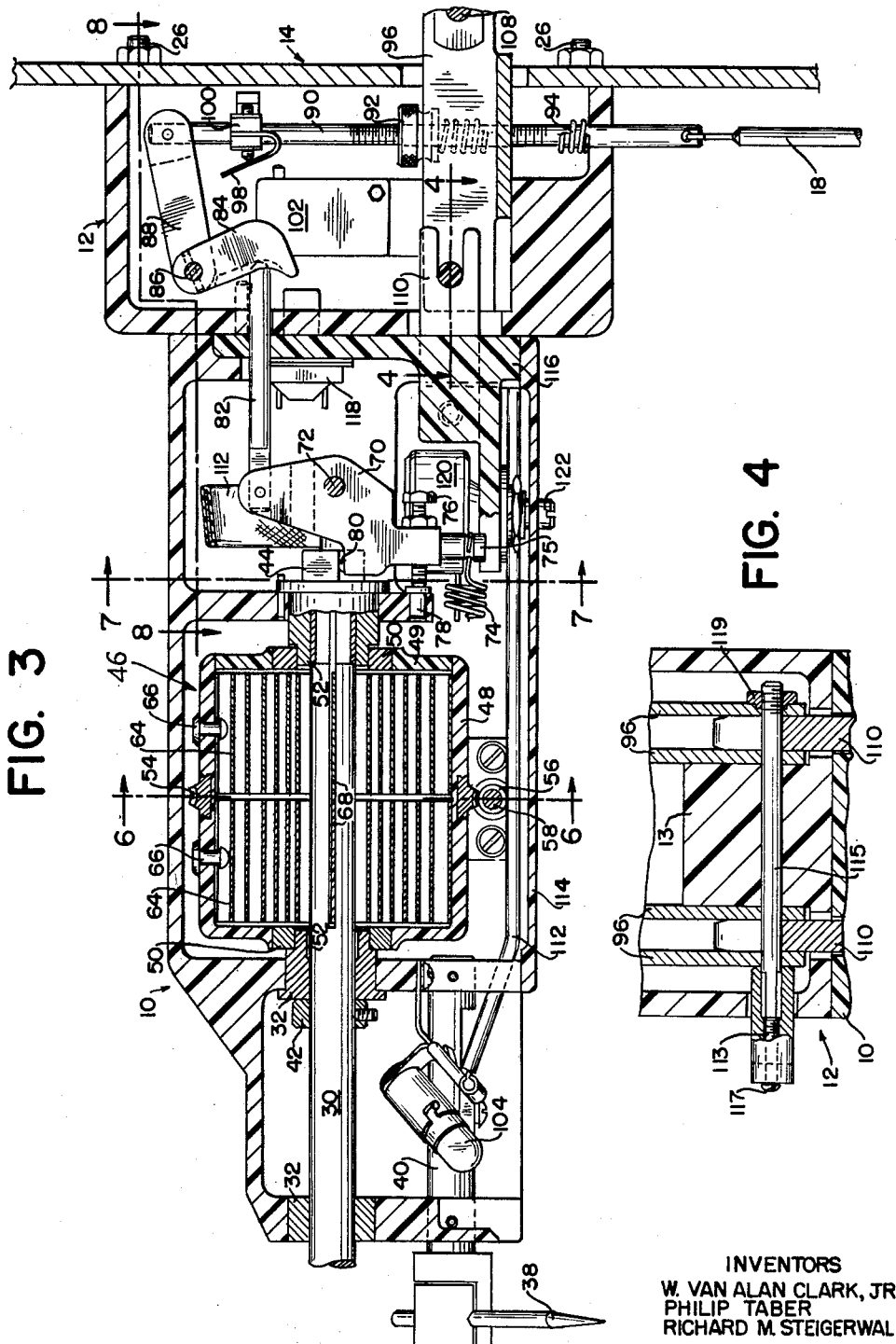

Sept. 8, 1964     W. VAN ALAN CLARK, JR., ET AL     3,148,264
PRESET, INTERCHANGEABLE WELDING HEADS
Filed Aug. 11, 1961                                6 Sheets-Sheet 3

INVENTORS
W. VAN ALAN CLARK, JR.
PHILIP TABER
RICHARD M. STEIGERWALD
BY
*Moses, Nolte & Nolte*
ATTORNEYS Sept. 8, 1964    W. VAN ALAN CLARK, JR., ETAL    3,148,264
PRESET, INTERCHANGEABLE WELDING HEADS
Filed Aug. 11, 1961    6 Sheets-Sheet 4

INVENTORS
W. VAN ALAN CLARK, JR.
PHILIP TABER
RICHARD M. STEIGERWALD
BY
Moses, Nolte & Nolte
ATTORNEYS Sept. 8, 1964  W. VAN ALAN CLARK, JR., ETAL  3,148,264
PRESET, INTERCHANGEABLE WELDING HEADS
Filed Aug. 11, 1961  6 Sheets-Sheet 6

INVENTORS
W. VAN ALAN CLARK, JR.
PHILIP TABER
RICHARD M. STEIGERWALD
BY
Moses, Nolte & Nolte
ATTORNEYS

United States Patent Office 3,148,264
Patented Sept. 8, 1964

3,148,264
PRESET, INTERCHANGEABLE WELDING HEADS
William Van Alan Clark, Jr., Marion, Philip Taber, South
Dartmouth, and Richard M. Steigerwald, Marion,
Mass., assignors, by mesne assignments, to The Sippican
Corporation, Mattapoisett, Mass., a corporation of
Massachusetts
Filed Aug. 11, 1961, Ser. No. 131,002
22 Claims. (Cl. 219—86)

This invention relates in general to electrical welding apparatus and in particular to an improved welding machine employing interchangeable head structures having preset and precalibrated electrode pressures and energy levels. The invention also relates to improvements in welding electrode control mechanisms having a minimum of inertia associated with electrode tip closure as well as a minimum change of electrode pressure with electrode movement.

Modern demands made upon the reliability, compactness, and ability to operate under extreme environmental conditions have resulted in increased use of welded connections in electronic packages. However, as in conventional soldered electrical connections, a welded electrical connection is subject to defects if not properly executed by the assembly worker.

Accordingly, the principal object of the present invention is to provide welding equipment which is designed to produce a highly reliable and uniform quality weld, as well as being easily changed to produce alternate characteristic welds with the same degree of reliability.

A principal feature of the invention is the provision of interchangeable plug-in welding heads which may be directly coupled to a regulated power supply. Each interchangeable head is provided with provisions to preset electrode pressure adjustment and preset electrical energy adjustment, thereby permitting precalibration of the interchangeable weld head by laboratory and quality control personnel. This arrangement permits a single operator at a welding station on an assembly line to make multiple welds between different materials that require different energy and pressure levels without the need for intricate and tedious adjustment and re-adjustment thereof to obtain the desired new welding characteristic. However, the pressure and energy adjustments may also be made by the operator should such necessity arise. The invention, by providing direct coupling of the interchangeable weld head to the power supply, eliminates the varying impedance of high current carrying cables employed in the prior art welders and their resultant effect upon the uniformity of weld settings required to produce the desired weld.

Each weld head in the present invention employs a novel arrangement of mechanism wherein an adjustable, pretensioned spring bias means is employed to continuously urge the electrode tips of the weld head into a closed position, and wherein separation means are employed for normally maintaining the electrode tips in open relation, said separation means being under the control of the machine operator. Typical prior art machines introduced a large human element into the quality of the resultant weld in view of the fact that the electrode pressure was usually determined by the extent to which and rate at which the operator applied pressure to the electrode tips through a foot pedal or the like. The arrangement of the present invention is such that the human element is completely removed from the resultant weld quality because the electrode pressure is preset and is merely released by the actuation of the control employed by the operator.

A further feature of applicant's novel weld head arrangement is that the mass, as well as the inertia of the parts moved by the electrode pressure spring is maintained extremely small. This factor is important in obtaining high quality and reliability melt-type welds, and allows the electrode tips to follow the small change in dimension associated with this type welding. The invention reduces the above-mentioned undesirable inertia effect by keeping to a minimum the number of parts between the spring and the moving electrode tip and by making these parts subject to rotational, rather than translational, movement.

A further feature of the invention is the use of bias means having a low spring rate, so that an insignificant pressure change occurs during the limited change in electrode tip dimension associated with the melt weld. The invention employs a spiral coil spring for this purpose operating over a very limited range of its capability where its spring rate is low, substantially linear and not subject to hysteresis. The aforesaid design features cooperate to provide a welding head of highly stable, adjustment maintaining capability which implements and makes possible the novel over-all welding machine arrangement employing interchangeable preset and precalibrated welding head structures.

Accordingly, an object of the invention is to provide a novel welding machine having interchangeable precalibrated welding heads.

Another object of the invention is to provide a welding machine wherein the electrode tip pressure is determined by preset spring bias means and totally independent of human variables controlled by the operator.

A still further object of the invention is to provide a welding head wherein the mass, as well as the inertia of the moving parts is small.

Another object of the invention is to provide a spring controlled welding electrode having a low spring rate and low hysteresis.

Another object of the invention is to provide an interchangeable welding head having heavy over-designed electrical connections therein to cut-down the transmission losses so that the electrical characteristics of the welding machine remain unchanged and unaffected by different head substitution with the same calibrated power supply.

A further object of the invention is to provide welding apparatus which is simple in design, easy to calibrate, uniform and trouble-free in operation, rugged in construction and economical to manufacture.

Other objects and advantages of the invention will become apparent and the invention will be fully understood from the following description and drawings, in which similar reference characters refer to similar parts in each of the several views and embodiments:

FIG. 3 is a vertical cross-sectional view of the embodiment of FIG. 1;

FIG. 4 is a fragmentary sectional view of the electrode clamping arrangement taken along line 4—4 of FIG. 3;

Figure 1:
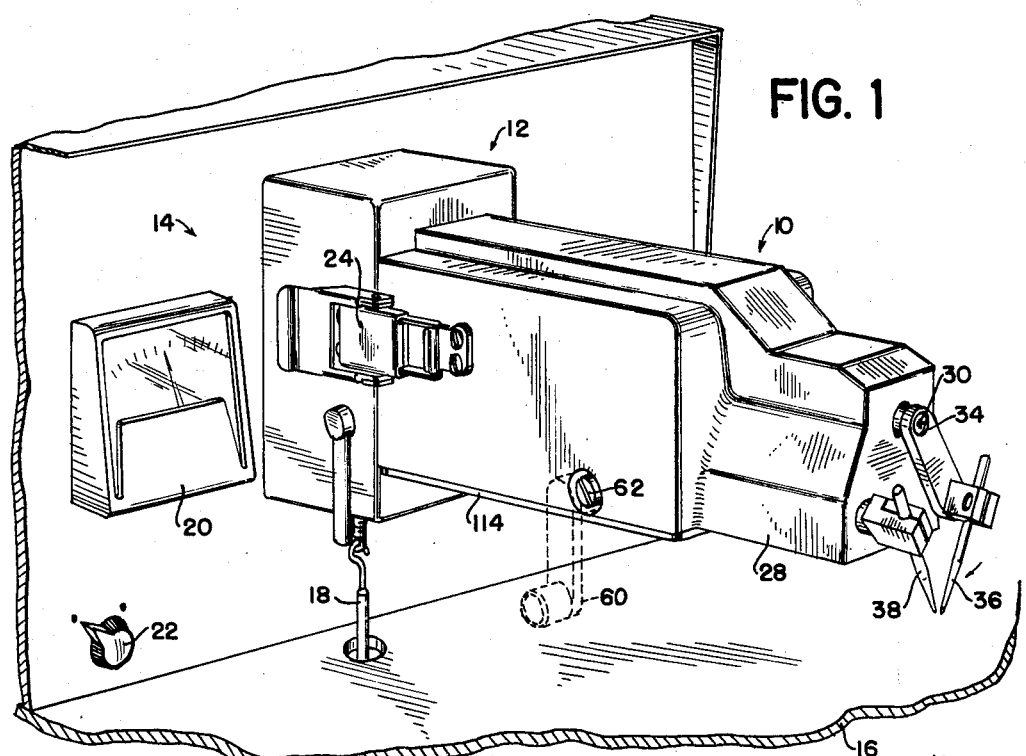
FIG. 1 is a perspective view of one form of the invention.
Figure 2:
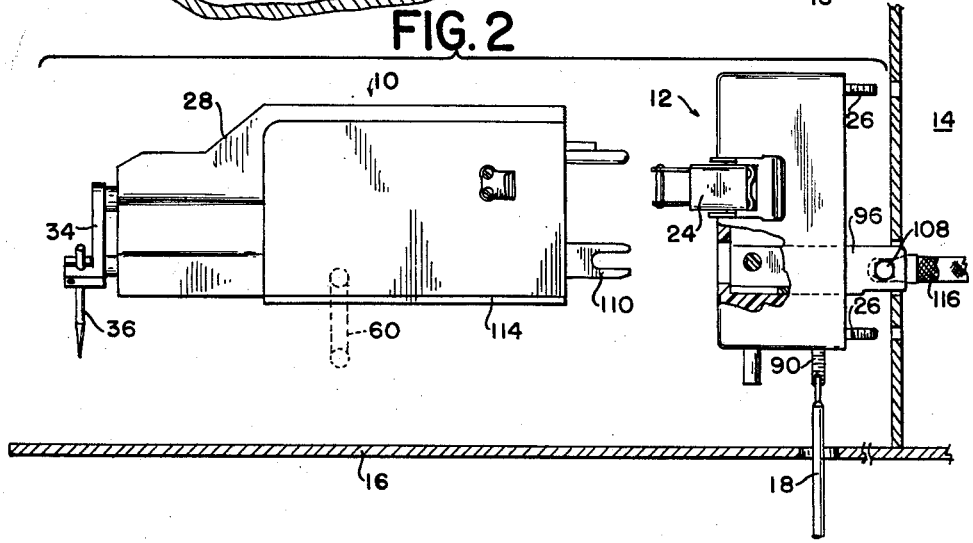
FIG. 2 is an exploded side elevational view of the invention showing the manner in which the respective parts are separable.

Referring to the drawings, the welder includes an interchangeable head assembly 10 affixed to a junction box assembly 12 which is, in turn, attached to the front panel of a power supply shown generally at 14. The power supply 14 rests on a worktable 16 through which a control rod 18 extends to connect with a portion of the junction box, to be explained hereafter. The power supply includes a conventional watt-seconds energy level meter 20 and a suitable control switch 22. A pair of quick release clamps 24 are located on each side of the weld head to releasably secure the head 10 to the junction box 12. The junction box, is in turn, held to the front panel of the power supply by bolts 26, to form an overhanging cantilever weld head arrangement above the surface of the worktable 16.

Figure 5:
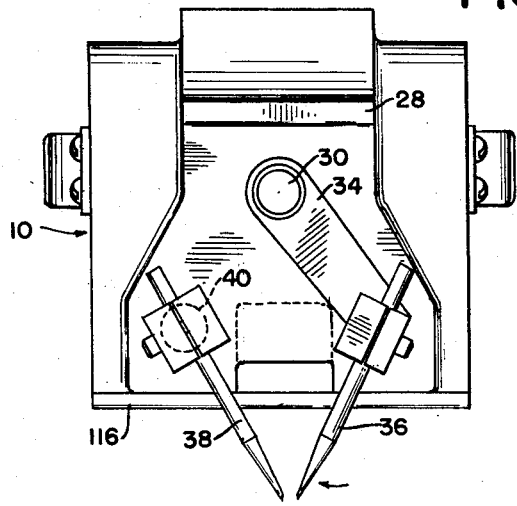
FIG. 5 is an end view of the weld head of FIG. 1.
Figure 6:
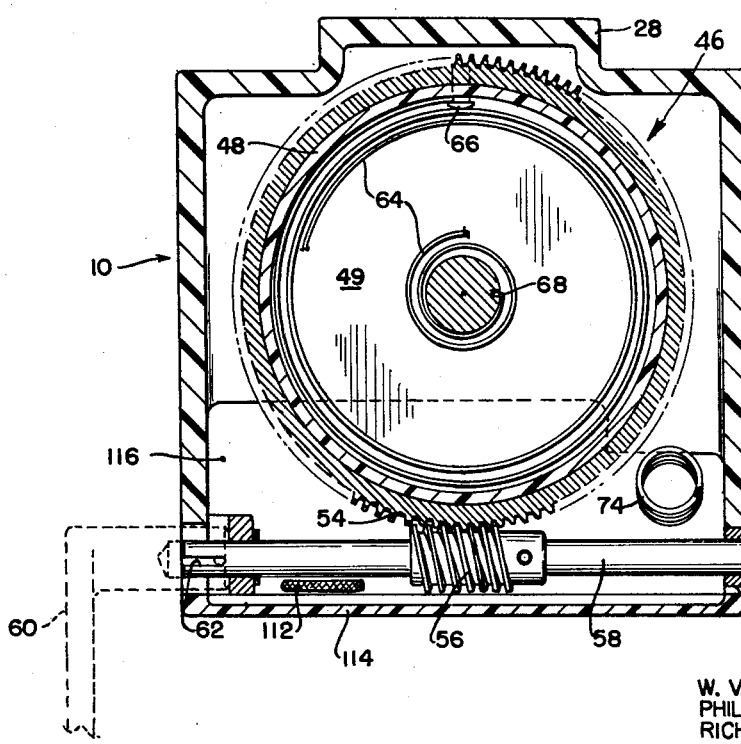
FIG. 6 is a vertical cross-section taken along line 6—6 of FIG. 3.

The weld head assembly 10 includes a housing 28 which may be made of any suitable dielectric material. Extending lengthwise through the housing 28 is an electrode mounting shaft 30 suitably pivoted in axially aligned bearings 32. One end of the shaft 30 extends exteriorly of the housing and mounts an arm 34 (FIG. 5) adapted to clamp a moving electrode 36 the tip of which is suitably aligned with a corresponding tip of a fixed electrode 38 rigidly mounted with respect to the housing upon a shaft 40. The shaft 30 is axially restrained with respect to the housing 28 by a collar 42 and a lever arm 44. The spring assembly shown generally at 46 includes a cup-shaped casing 48 and an end cap 49, each of which carries a bushing 50 seated upon a shoulder portion 52 cut in an end portion of the bearings 32 to allow relative rotation of the spring casing 48 about the shaft 30. The casing 48 is provided with a ring or worm gear about its outer periphery in engagement with a worm 56 secured to a shaft 58 pivotally mounted in the sides of housing 28. A removable adjustment crank 60 is shown in dotted lines to engage a key or slot 62 in one end of the shaft 58 so that the worm 56 may be rotated to impart a corresponding angular rotation to the casing 48 of the spring assembly 46. Within the casing are a pair of similar spiral coil springs 64 secured at their outer ends by rivets 66 to the casing 48. The inner end of each of the springs 64 is engaged with a slot in the shaft 30 by a suitable tab portion 68.

Figure 7:
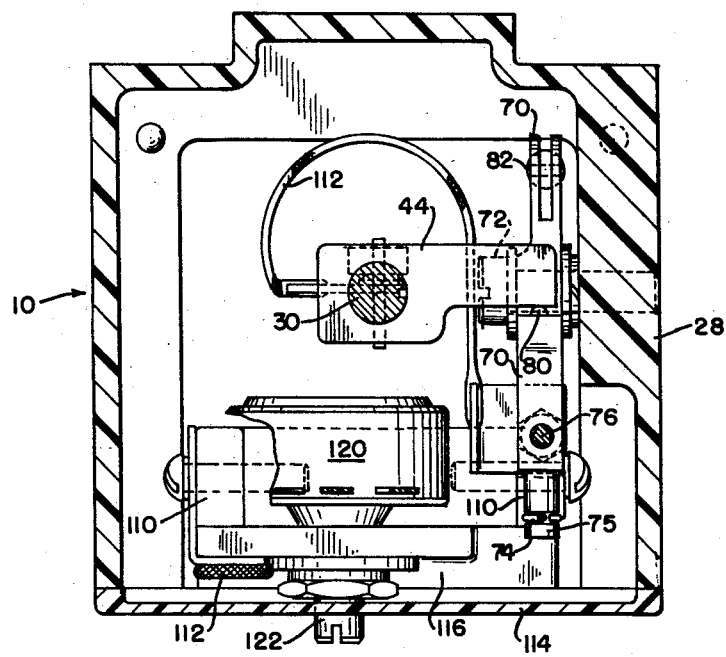
FIG. 7 is a vertical cross-section taken along line 7—7 of FIG. 3.
Figure 8:
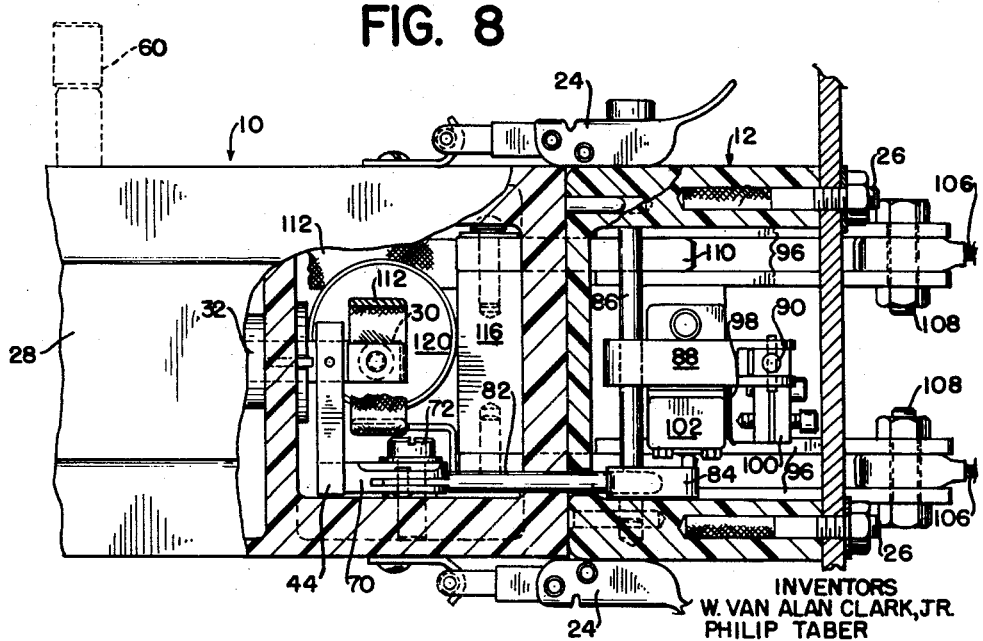
FIG. 8 is a fragmentary cross-sectional view taken along line 8—8 of FIG. 3.

Adapted to contact and angularly rotate the lever arm 44 secured to the end of the shaft 30 is a bell crank 70 pivoted on a side wall of the housing 28 by a screw support 72 (FIGS. 3, 7 and 8). The bell crank 70 includes a lower depending pin portion 75 to which is secured one end of a tension spring 74; the other end of which is secured to the housing 28. Tension spring 74 is of sufficient strength to urge the bell crank 70 in a clockwise direction, thus, forcing an anvil 80 into contact with the underside of the end of lever arm 44 to rotate the arm and its associated shaft 30 in a counterclockwise direction to normally hold the electrodes 36 and 38 in separated relation. The force of spring 74 acting through the bell crank and the lever arm 44 will maintain the separated position of the electrodes shown in FIG. 5 for all normal pressure adjustments made to the springs 64 by relative rotation of the casing 48 with respect to the housing 28. The bell crank 70 carries an adjustable stop screw 76 whose end contacts a seat 78 secured to the housing to establish the desired electrode tip separation clearance. Pivotally connected to an upper portion of the bell crank 70 is a push rod 82 extending horizontally through an aperture in a back plate 116 of the head 10.

The free end of rod 82 seats in a groove in an arm 84 pivoted at its upper end to a shaft 86 extending horizontally across the housing 83 of the junction box 12. Also secured to the shaft 86 is a lever arm 88 pivotally connected to a downwardly extending link 90 which is secured at its lower end to the foot control rod 18. The link 90 includes a coil spring 94 abutting the housing 83 at its lower end and the adjustment nut 92 at its upper end. In this manner, proper positioning of the nut 92 on the threaded portion of the link 90 will preload the coil spring 94 so that the link remains in the position shown during non-operation of the foot pedal. By varying the position of adjustment nut 92, any desired foot pedal operating force may be obtained. Attached to the upper portion of the link 90 is an adjustable means 100 which mounts a leaf spring 98 which is adapted to operate the plunger of a conventional snap switch 102 during the downward travel of the link 90. Extending horizontally through the junction box 12 are two pairs of electrical busses 96 adapted to be electrically connected by bolts 108 to cables 106 connected to the power supply. The other ends of the busses 96 are adapted to engage each side of a pair of weld head prongs 110 by a clamping means shown generally at 111. Each of the prongs 110 is electrically connected to its respective electrode through suitable high-capacity cables 112.

The clamping means includes a handle portion 113 connected to a compression rod 115 by a screw 117. The rod 115 is made of a suitable dielectric material and includes a threaded end portion which engages a nut 119 secured to the outer face of the bus 96. Rotation of the rod 115 by the handle 113 is effective to clamp the busses 96 and prongs 110 into tight electrical contact against the opposite faces of a shoulder portion 13 of the box assembly 12.

Each interchangeable weld head assembly 10 is provided with suitable electrical control means so that the interchangeable head per se determines the watt-second energy level that is supplied to it by the power supply. For these purposes the head carries a potentiometer 120 which may be adjusted through a slot 122 extending through an aperture in the housing cover 114. The head also mounts a multi-pin electrical connector shown generally at 118 which electrically connects the terminals of the potentiometer 120, as well as a prefocused illumination lamp 104 to the proper circuits in the power supply by electrical means (not shown).

In operation of this form of the invention, the welding operator need only select the desired weld head 10 having precalibrated energy, as well as electrode pressure characteristics, and clamp it to the front face of the junction box 12 of the power supply 14, thereby automatically aligning the end of the push rod 82 with the groove in the arm 84. In this position the tip of the electrodes 36 and 38 will be in separated relation in position for the insertion of the workpiece therebetween by the operator. Once the operator has located the workpiece properly for welding, control 18 is actuated to rotate the bell crank 70 in a counterclockwise direction through the linkage of the rod 90, arms 88 and 84 and push rod 82. As the bell crank 70 is rotated counterclockwise, the restraint upon the end of lever arm 44 is released and the stored energy in the spiral coil spring 64 rotates the shaft 30 in a clockwise direction, thereby moving the electrodes 36 and 38 into contact with the workpiece (not shown). Upon continued downward motion of the foot pedal by the operator the leaf spring 98 actuates the snap switch 102 to energize the electrode tips. Because the electrode tips remain unenergized until the bell crank 70 has completely released the end of the lever arm 44, a uniform electrode spring pressure is ensured for each weld. Furthermore, due to the low inertia of the rotating shaft 30, the moving electrode tip 38 will almost instantaneously follow-up any change in dimension occurring in the melt-weld process thereby insuring a high quality electrical connection. If the particular workpiece being fabricated requires a subsequent weld with different electrical characteristics, the operator need only substitute an alternate precalibrated weld head assembly having the desired characteristics.

Figure 9:
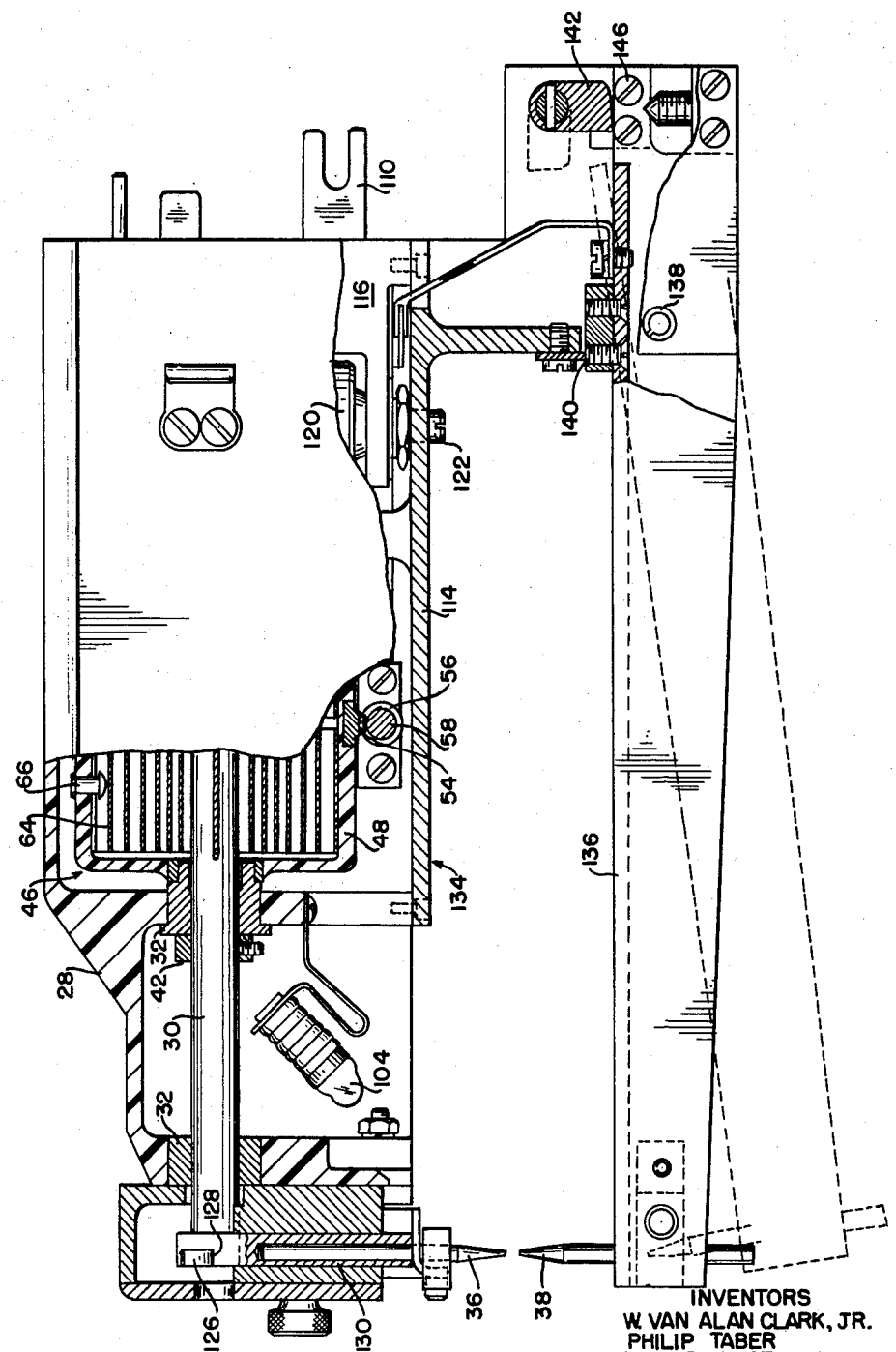
FIG. 9 is a side elevational view, partly in section, of an alternate interchangeable welding head.
Figure 10:
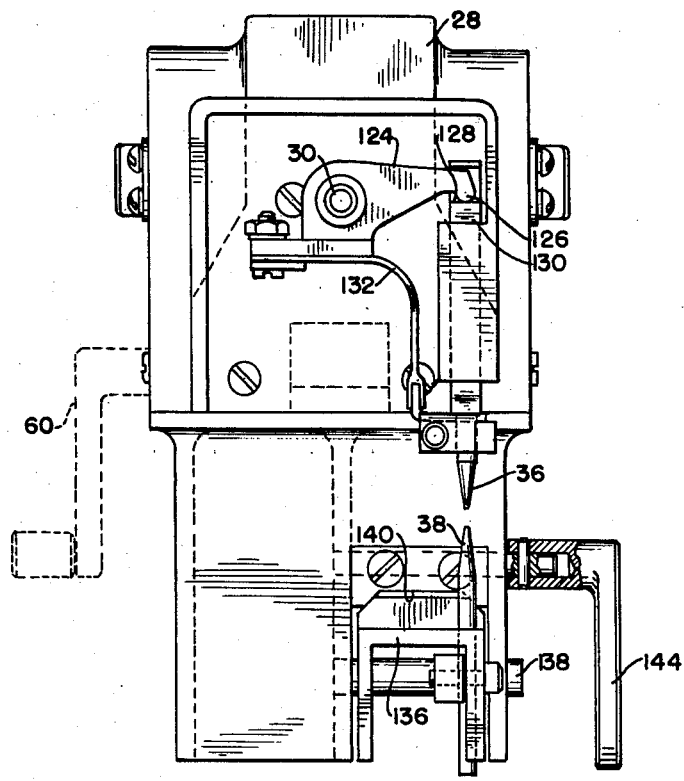
FIG. 10 is an end view of the embodiment of FIG. 9.

Referring to FIGS. 9 and 10, an alternate embodiment of weld head is shown, wherein the electrodes are adapted to be in axial alignment with each other and to operate in a vertical reciprocating fashion; as distinguished from the previous embodiment where the moving electrode traveled in an arcuate path. It should be appreciated that in this embodiment of the invention those parts having similar functions to the parts previously described in the previous embodiment bear like reference numerals and will not be described in detail in relation herewith.

In this embodiment, as in the embodiment of FIG. 1, a cable 112 conducts the electrical energy pulse to the righthand end of a rotatable shaft 30. The left end of the shaft 30 carries an arm 124 having a circular end portion 126 in contact with a slot 128 in a vertically reciprocable slider member 130. The slider 130 has an aperture therein mounting the moving electrode 36. The electrical energy pulse is transmitted from the left hand end of the shaft 30 to the electrode via a cable 132 suitably affixed at its lower end to the lower portion of the electrode.

Affixed to the lower surface of the housing 28 is a lower electrode support assembly shown generally at 134. The support assembly includes a pivoted lower arm 136 having a U-shaped cross-section which carries the lower electrode 38 in fixed relation in one end thereof. The arm 136 is pivoted at 138 to afford temporary lowering thereof to provide access for jigs or positioning frames holding the apparatus to be welded. To facilitate dropping the lower arm 136, it is provided with an extending stop portion 146 which abuts a movable locking cam 142, which may be rotated by the handle 144 to the dotted position to allow lowering of the arm 136 to the dotted position shown. The pivot 138 includes an adjustable centering stop mechanism 140 so that when the lower arm is in its locked uppermost position, the tip of the electrode 38 may be adjusted to be in accurate alignment with the tip of the electrode 36.

Thus, the invention has provided novel welding apparatus capable of producing uniform quality welds totally independent of the human operator element. The novel arrangement of the division of parts allows the interchangeability of various welding heads with a precalibrated power supply, thereby obviating the need for the operator to make any adjustments to the apparatus. The arrangement of the invention permits precalibration of both the energy and pressure levels of each interchangeable welding head under laboratory conditions, which may be held to accurate tolerances with a minimum number of trained personnel. The arrangement facilitates the application of modern production techniques to reliable and uniform quality miniature welded electrical connections.

While specific embodiments of the invention have been shown and described in detail to illustrate the application of the invention principles, it will be understood that the invention may be embodied otherwise without departing from such principles.

We claim:

1. Electric welding apparatus comprising in combination energy supply means, and a welding head removably secured to said supply means, said head including; a pair of opposed electrodes, means biasing the tips of said electrodes toward each other with a substantially constant predetermined force, separation means normally holding the electrode tips in spaced relation to allow insertion of a workpiece to be welded therebetween, means to adjust the preload of said bias means, means electrically connecting said electrodes to the output of said supply means, means carried by said head for adjusting the energy level delivered by said supply means to said electrodes, control means to render said separation means ineffective, and junction means to permit electrical and mechanical release of said head from said energy supply means to allow replacement thereof with another similar head having alternate predetermined bias means and energy level adjustments.

2. Apparatus according to claim 1 wherein said bias means includes at least one spiral coil spring of low spring rate to provide a minimum change of electrode pressure during movement thereof associated with the change in electrode tip separation occurring during welding.

3. Apparatus according to claim 2 wherein said bias means further includes a rotatable shaft affixed to the inner end of said spiral coil spring and wherein one of said electrodes is connected to said shaft.

4. Apparatus according to claim 3 wherein said electrodes are in axial alignment.

5. Apparatus according to claim 3 wherein the tip of said electrode connected to said shaft travels in an arcuate path.

6. A weld head comprising a housing, means for releasably securing said housing to a suitable electrical power supply, a shaft member rotatably mounted upon said housing, a first electrode secured to said housing, a second electrode connected from said shaft member and movable therewith, spring bias means connected to said shaft member adapted to urge the tip of said second electrode into proximate relationship with the tip of said first electrode, separation means normally holding the electrode tips in spaced relation, movable control means to render said separation means ineffective, and means to electrically connect said electrodes to an external power supply after a predetermined movement of said control means.

7. A weld head according to claim 6, including means to adjust the preload of said spring bias means to a predetermined electrode closure force.

8. A weld head according to claim 7, including means to adjust the electrical energy level delivered by the external power supply to said electrodes.

9. A welding head comprising a housing, a shaft rotatably mounted on said housing, a first electrode fixed to said housing, a second electrode connected to said shaft, bias means to urge the tip of said second electrode into proximate relationship with the tip of said first electrode, said bias means including at least one spiral coil spring having its inner end connected to said shaft, means adjustably positioning and connecting the outer end of said spiral coil spring relative to said housing, separation means normally holding the electrode tips in spaced relation, movable control means to render said separation means ineffective, and means to electrically connect said electrode to an external power supply after a predetermined movement of said control means.

10. A welding head according to claim 9 wherein the tip of said second electrode is caused to move in an arcuate path in a plane at substantially right angles to the axis of rotation of said shaft upon rotation thereof.

11. A welding head according to claim 9 wherein said first electrode and said second electrode are in axial alignment and wherein said second electrode is adapted to reciprocate in a linear path.

12. A welding head according to claim 9 wherein said separation means includes a tension spring having a preload sufficient to normally overcome the spring bias force of said spiral coil spring.

13. A welding head according to claim 12 wherein said means adjustably connecting the outer end of said spiral coil spring to said housing includes a casing around the outer periphery of said spring affixed thereto, said casing having a ring gear thereabout, and a worm engageable with said ring gear to adjustably position said casing relative to said housing.

14. A welding head according to claim 11 wherein said first electrode includes cam actuated mounting means to provide temporary increased electrode separation.

15. Electric welding apparatus comprising in combination a horizontal supporting surface, a substantially rectangular power supply mounted upon said surface, an elongated welding head assembly, and means releasably securing one end of said welding head assembly to an upper portion of a vertical wall of said power supply whereby an unobstructed open welding work area is presented between the underside of said welding head assembly and said supporting surface.

16. Apparatus according to claim 15 wherein said welding head assembly further includes control means extending downwardly from said assembly, adjacent said power supply, through an aperture in said supporting surface.

17. A welding head comprising: a shaft arranged for rotation about its longitudinal axis; a lever arm integral with one end of the shaft; an electrode holding arm connected to the other end of the shaft; an electrode coupled with the electrode holding arm; a pivoted bell crank including an anvil portion; a restraining spring for pivotally urging the bell crank toward the lever arm so that the anvil portion bears against the lever arm; a cylindrical casing coaxial with, and surrounding, the shaft, the cylindrical casing including a set of worm gear teeth peripherally arranged thereon; at least one spiral spring situated within the cylindrical casing, the spiral spring being arranged coaxial with, and surrounding, the shaft, one end of the spiral spring being connected to the cylindrical casing, the other end of the spiral spring being connected to the shaft; a rotatable worm shaft arranged for engagement with the worm gear teeth, the rotational motion of the worm shaft causing the cylindrical casing to rotate whereby the spiral spring tension is adjusted to apply a torque to the shaft; and linkage means operable for pivoting the bell crank in opposition to the urging of the restraining spring whereby the anvil portion of the bell crank moves out of bearing contact with the lever arm to permit the shaft to turn due to the influence of the torque applied thereto by the spiral spring.

18. A welding head comprising: a shaft arranged for rotational movement about its longitudinal axis; an electrode coupled with an end of the shaft for rotational movement therewith; at least one spiral spring arranged with the shaft for applying a turning moment thereto; adjustment means for varying the energy stored by the spiral spring; biasing means for applying at least an equal, opposing, turning moment to the shaft thereby limiting rotational movement of the shaft at a predetermined angular position; and means operable for disabling the biasing means whereby the shaft is enabled to rotate and move the electrode to a predetermined position due to the turning moment applied to the shaft by the spiral spring.

19. A welding machine comprising: a welding head including a movable spring-torqued electrode, a fixed electrode, electrical conductor means including plug means coupled with the electrode, and adjustable potentiometer means, coupled with the conductor means, for presetting the electrical energy level applied to the electrode; and, junction box means including electrical potential source means and control means, the junction box's potential source means being adapted for receiving the welding head's plug means, said control means being operable for initiating movement of the spring-torqued electrode toward the fixed electrode.

20. A welding head comprising: a housing; a rotatable shaft situated in the housing and protruding therefrom; an electrode holder rigidly coupled with the shaft protrusion; an electrode supported by the electrode holder; a casing coaxially surrounding a longitudinal portion of the shaft, the casing being mounted for rotation within the housing relative to said shaft and said housing; spring means within the casing coupled with the casing and the shaft; means for rotating the casing relative to the shaft thereby varying the torque exerted by the spring means on said shaft; crank means engaging the shaft to prevent rotation of the shaft in response to the torque applied thereto by the spring means; linkage means partly within the housing operable for disengaging the crank means to enable the shaft to be rotated due to the torque applied thereto by the spring means; electrical conductor means including plug means coupled with said electrode, the plug means being external of said housing and adapted for being plugged into a source of electrical potential; and, potentiometer means, coupled with said plug means, for setting at a predetermined level the electrical energy translated from said plug means to said electrode.

21. A welding head comprising: a housing; a rotatable shaft situated in the housing and protruding therefrom; a lever arm coupled with the shaft protrusion for rotational movement therewith; a movable electrode holder arranged with the lever arm for reciprocating movement in response to rotational motion of the lever arm; a first electrode coupled with the movable electrode holder; a casing coaxially surrounding a longitudinal portion of the shaft, the casing being mounted for rotation within the housing relative to the shaft and the housing; spring means within the casing coupled with the casing and the shaft; means for rotating the casing relative to the shaft to vary the torque exerted by the spring means on the shaft; crank means normally engaging the shaft to prevent rotation of the shaft due to the torque exerted thereon by the spring means; linkage means operable for disengaging the crank means from the shaft to permit the torque of the spring means to rotate the shaft; an elongated arm cantilevered-mounted from the housing, one end of the elongated arm including fixed electrode holding means arranged opposite the movable electrode holder, the other end of the elongated arm being fixed by adjustable fastening means to the housing; and a second electrode coupled with the electrode houlding means, the tips of the first and second electrodes being opposite each other.

22. A welding head as defined by claim 21 wherein the adjustable fastening means includes pivot means and screw means, the pivot means enabling movement of the elongated arm and second electrode away from the housing and first electrode to accommodate arrangement of work pieces to be welded; said screw means being adjustable to vary separation of the tips of the opposing first and second electrodes.

References Cited in the file of this patent
UNITED STATES PATENTS

| | | |
|---|---|---|
| 1,610,616 | Schlaf | Dec. 14, 1926 |
| 2,448,865 | Crombach | Sept. 7, 1948 |